US012204668B1

(12) United States Patent
Brandwine et al.

(10) Patent No.: US 12,204,668 B1
(45) Date of Patent: Jan. 21, 2025

(54) USER-CONFIGURABLE REQUEST-BASED POLICIES FOR A DATA STORAGE SYSTEM

(71) Applicant: Amazon Technologies, Inc., Seattle, WA (US)

(72) Inventors: Eric Jason Brandwine, Haymarket, VA (US); Rebecca Claire Weiss, Vienna, VA (US); Andrew Kent Warfield, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 463 days.

(21) Appl. No.: 17/393,813

(22) Filed: Aug. 4, 2021

(51) Int. Cl.
G06F 21/00 (2013.01)
G06F 21/62 (2013.01)
(52) U.S. Cl.
CPC ................ G06F 21/6218 (2013.01)
(58) Field of Classification Search
CPC .................................. G06F 21/6218
See application file for complete search history.

(56) References Cited

U.S. PATENT DOCUMENTS

| 2013/0123987 | A1* | 5/2013 | Kase | B25J 13/003 901/47 |
| 2014/0108474 | A1* | 4/2014 | David | H04L 67/568 707/827 |
| 2016/0127262 | A1* | 5/2016 | Lawrence, III | G06F 16/951 709/219 |
| 2017/0063717 | A1* | 3/2017 | Wang | H04L 67/02 |

* cited by examiner

Primary Examiner — Ghazal B Shehni
(74) Attorney, Agent, or Firm — Nicholson DeVos Webster & Elliott LLP

(57) ABSTRACT

Techniques are described for enabling users to create and configure request-based policies used by a data storage system to generate custom responses to particular types of requests for users' stored data objects. The request-based policies include rules used to identify types of requests for data objects and corresponding types of responses to be generated responsive to detecting such requests. The types of responses that can be specified in such policies include responses other than simply returning a requested data object or denying a request. For example, a rule for certain types of responses can instruct the data storage system to return a dynamically generated data object, another rule can instruct the system to return a different data object than the one requested, and so forth.

20 Claims, 8 Drawing Sheets

USER-CONFIGURABLE REQUEST-BASED POLICIES FOR A DATA STORAGE SYSTEM

BACKGROUND

Providers of cloud computing web services commonly provide various types of data storage services. These services can be used to store any virtually type of data object, providing users with scalable storage that can be used store data for internet applications, backup and recovery, data archives, and the like. In some cases, a data storage service enables data objects stored by the service to be accessed using a representational state transfer (REST) based application programming interface (API), where objects are identified by unique Uniform Resource Identifiers (URIs) and can be accessed by client computing devices via the internet using requests identifying relevant data object URIs.

BRIEF DESCRIPTION OF DRAWINGS

Various embodiments in accordance with the present disclosure will be described with reference to the drawings, in which.

DETAILED DESCRIPTION

Figure 1:
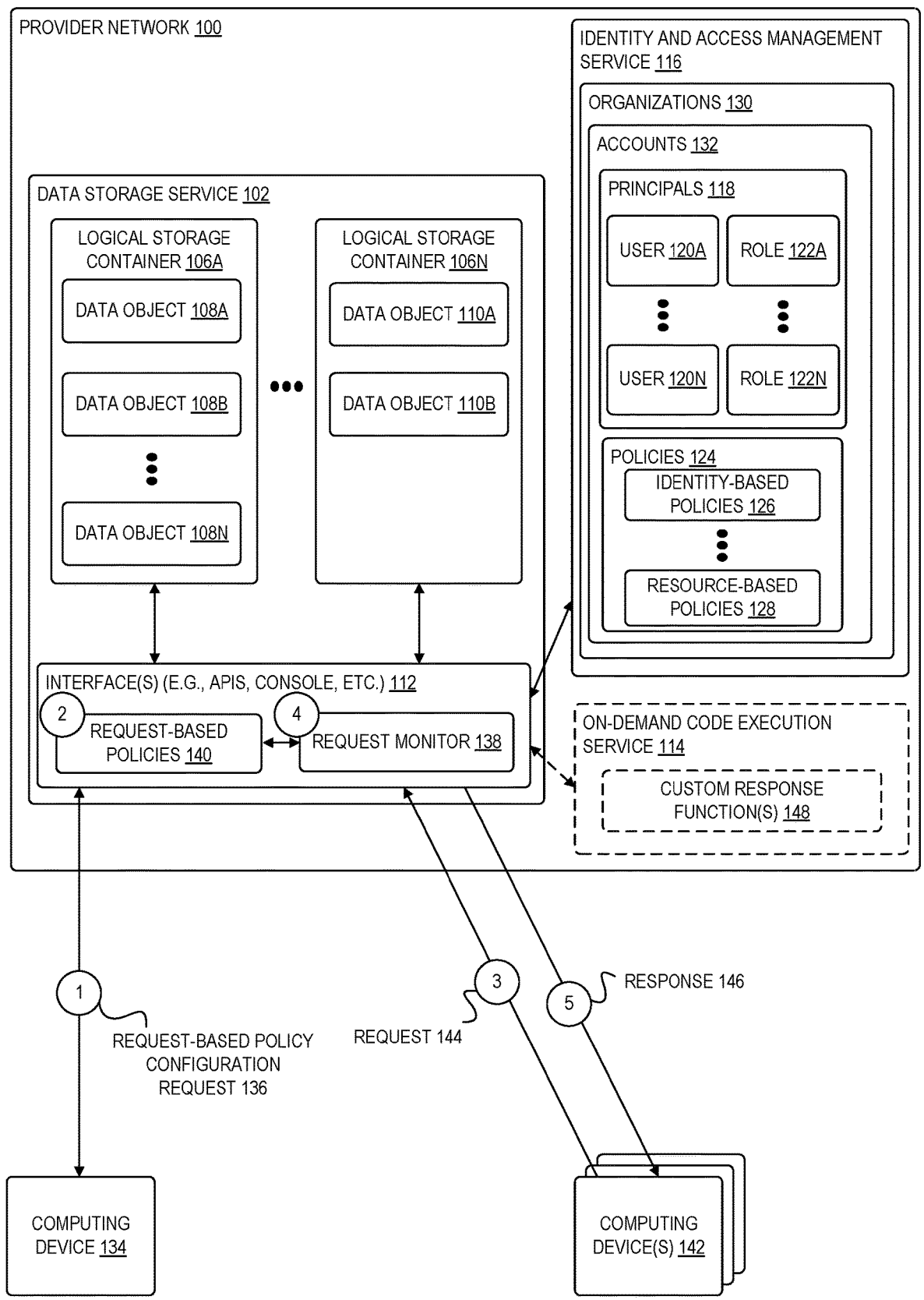
FIG. 1 is a diagram illustrating an environment for enabling users to create request-based policies that can be applied to requests involving data objects stored by a data storage service of a cloud provider network according to some embodiments.

The present disclosure relates to methods, apparatus, systems, and non-transitory computer-readable storage media for enabling users to create and configure request-based policies used by a data storage system to generate custom responses to particular types of requests involving users' stored data objects. For example, some cloud providers provide data storage services that enable access to users' stored data objects using a representational state transfer (REST) based application programming interface (API) over Hypertext Transfer Protocol (HTTP), e.g., such that data objects can be requested by client computing devices using Uniform Resource Identifiers (URIs) uniquely identifying users' logical storage containers and data objects. To provide users with greater control over access to their stored data objects, according to embodiments described herein, users can create request-based policies that include rules used to identify types of requests involving a users' data objects and corresponding types of responses to be generated responsive to detecting such requests. The types of responses that can be specified in such policies include, for example, responses other than simply returning a requested data object or denying a request. For example, a rule identifying a certain type of request can instruct the data storage system to return a dynamically generated data object, another rule can instruct the system to return a different stored data object than the one requested, and so forth. Among other benefits, such policies enable users to control the way requests for their data objects are handled beyond simple "allow" or "deny" actions typically provided by access management systems.

As indicated above, many cloud providers provide a variety of data storage services that offer scalability, data availability, security, and performance. These services generally enable users to store virtually any type of data for a range of use cases such as data lakes, websites, backup and restore, archive, big data analytics, and the like. Some such data storage services provide RESTful web services interfaces that enables users to store and retrieve data from virtually any internet-connected client device. These services typically provide access control mechanisms for users' data stored by the service, where such access controls enable users to specify what users can access which data objects and what types of actions certain users can perform (e.g., read, write, etc.).

Although these types of access controls can be useful for managing access to users' data, sometimes users might desire the ability to have a data storage system perform actions other than "allow" or "deny" responsive to identifying certain types of requests for their data. For example, responsive to identifying a request from a known web crawler that intends to index data objects contained in a users' logical storage container, a user might desire for the storage system to return a robots exclusion file (robots.txt) that specifies indexing rules, where the user may not actually have a robots.txt file stored in the logical storage container. As another example, responsive to identifying a request suspected to be associated with a client device "scanning" for data objects in a users' logical storage container, a user might desire to return a file containing useless junk data. In general, users might desire for a wide variety of actions, beyond simple "allow" or "deny" actions, to be performed responsive to the identification of certain types of requests for their stored data objects.

According to embodiments described herein, users can create and configure request-based policies that enable users to customize types of responses generated by a data storage service for scenarios similar to those described above and many others. Additional details related to the configuration and use of such request-based policies is described in more detail hereinafter.

FIG. 1 is a diagram illustrating an environment for enabling users to create request-based policies that can be applied to requests involving data objects stored by a data storage service of a cloud provider network according to some embodiments. A provider network 100 (or, "cloud"

provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a data storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud provider" or "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to an AZ of the cloud provider network via a publicly accessible network (e.g., the Internet, a cellular communication network), e.g., by way of a transit center (TC). TCs are the primary backbone locations linking customers to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations, such as transferring customer data to and from the customer resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

A container service can be a container orchestration and management service (referred to in various implementations as a container service, cloud container service, container engine, or container cloud service) that allows users of the cloud provider network to instantiate and manage containers. In some embodiments the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

In some embodiments, a provider network 100 includes one or more data storage services 102. The data storage service 102, for example, provides a data storage system that enables users to store and retrieve any amount of data from virtually any location. The data storage system further provides durability, availability, performance, security, and scalability features that enable users a great deal of flexibility to store any type of data. In some embodiments, the data storage service 102 provides a key-based object store where, e.g., data objects can be organized into logical storage containers (e.g., data objects 104A, 104B, . . . , and 104N stored in the logical storage container 106A, and data objects 108A, 108B stored in the logical storage container 106N). When a user stores data, each data object is assigned a unique object key that can later be used to retrieve the data. Keys can be any string, and they can be constructed to mimic hierarchical attributes. In some embodiments, the data storage service 102 provides a standards-based REST web services interface that is designed to work with any internet-development toolkit. In some embodiments, access to the data storage service 102 is provided via various interface(s) 112, including APIs, web-based consoles, etc.

In some embodiments, a provider network 100 includes an on-demand code execution service 114. The on-demand code execution service 114 (referred to in various embodiments as a function compute service, functions service, cloud functions service, functions as a service, or serverless computing service) can enable customers of the provider network 100 to execute their code on cloud resources without having to select or manage the underlying hardware resources used to execute the code. For example, a customer can use the on-demand code execution service 114 by uploading their code and use one or more APIs to request that the on-demand code execution service 114 identify, provision, and manage any resources required to run the code.

In some embodiments, an identity and access management service 116 is a service that enables users to securely control access to cloud provider network resources (e.g., data objects 108A, 108B, . . . , 108N and any other resources associated with various users of the provider network 100). The identity and access management service 116 is used to control who is permitted to authenticate (e.g., sign in) with the cloud provider network 100 and who is authorized (e.g., has permissions) to use resources provided by the cloud provider network. In general, a resource is a concept used to capture the domain of items that can be created, read, modified, or deleted by customers in a cloud provider network 100. Examples of resources also include principals (e.g., principals 118, including example users 120A, . . . , 120N and roles 122A, . . . , 122N) and policies 124 (e.g., including identity-based policies 126, trust policies 128, among other possible policies). FIG. 1 further illustrates the concept of an organization 130, which can include any number of associated accounts 132, which in turn can include any number of users and roles.

In some embodiments, when a person initially creates an account with the cloud provider network 100, the person begins with a single sign-in identity that has complete access to all cloud provider network services and resources associated with the account (e.g., a root user). The root user identity may be accessed by signing in with a username (e.g., an email address) and a password used to create the account. Cloud provider networks 100 typically advise users not to use a root user for most tasks and to instead create additional user accounts with defined permissions (e.g., including one or more of user accounts 120A, . . . , 120N). In some embodiments, a user can grant different permissions to different user accounts for different resources. For example, a user account might be configured to allow some users complete access to a hardware virtualization service, a data storage service 102, and other cloud provider network 100 resources. For other users, a user account might allow read-only access to some logical storage containers, or permission to administer some compute instances, etc.

In some embodiments, an account includes identity-related objects stored as part of the identity and access management service 116 including, for example, users 120A, ..., 120N, groups (not illustrated), roles 122A-122N, policies 124, and the like. These identity-related resources can be added, edited, and removed by users of the cloud provider network 100 with sufficient privileges, e.g., using a web-based console, API, CLI, or other interface provided by the identity and access management service 116.

In some embodiments, a principal 118 represents a person or application that can make a request for an action or operation on a resource of the cloud provider network 100 (e.g., a resource of the data storage service 102 or of the identity and access management service 116). The set of principals 118 associated with an account 132 can include any number of users 120A, ..., 120N and roles 122A, ..., 122N. A cloud provider network request occurs when a principal (e.g., a user or a role) sends a request for an action or operation on a resource. A request can include some or all of the following information: the action or operations that the principal wants to perform, the resource object upon which the actions or operations are performed, the person or application that used an entity (e.g., a user or role) to send the request, environment data (e.g., information about the IP address, user agent, SSL enabled status, time of day, etc.), and resource data (e.g., data related to the resource that is being requested, such as a resource identifier, or a tag name). In some embodiments, the identity and access management service 116 gathers the information contained in a request into a request context, which is used to evaluate and authorize the request.

In some embodiments, for a request to be completed, the identity and access management service 116 determines whether the requesting principal is authorized (e.g., permitted) to complete the request. During authorization, the identity and access management service 116 uses values included in the request context to check for policies that apply to the request (e.g., one or more of policies 124). In some embodiments, some requests can be unauthenticated, e.g., not associated with any particular account of the provider network 100 and optionally authorized depending on policies associated with a resource to which the request applies.

The identity and access management service 116 uses the policies 124 to determine whether to allow or deny the request. In some embodiments, the policies are stored by the identity and access management service 116 as JavaScript Object Notation (JSON) documents (or using any other data format) and specify the permissions for principal entities. In some embodiments, there are several types of policies 124 that can affect whether a request is authorized including, e.g., identity-based policies 126, trust policies, among other policies. For example, to provide users with permissions to access resources in their own account, identity-based policies can be configured, while resource-based policies may be used for granting cross-account access to resources. In some embodiments, the identity and access management service 116 checks each policy that applies to the context of a request. If a single permissions policy includes a denied action, the identity and access management service 116 denies the entire request. In some embodiments, an identity and access management service 116 denies requests by default, such that a request is authorized only if every part of a request is allowed by applicable permissions policies.

In some embodiments, once a request is authenticated and authorized, the identity and access management service 116 approves the actions or operations in the request. Operations are defined by a service and include actions that can be performed on or relative to a resource, such as viewing, creating, editing, and deleting that resource. For example, the identity and access management service 116 may support actions such as CreateUser, DeleteUser, CreateRole, and AssumeRole, among many other possible actions. To allow a principal to perform an operation, the action is included in a policy that applies to the principal or the affected resource.

In some embodiments, identity-based policies 126 are permissions policies that are attached to an identity, such as a user, group, or role in an account. In some embodiments, resource-based policies are permissions policies that are attached to a resource such as a data object 108A, ..., data object 108N or a role trust policy. A resource-based policy controls what actions a specified principal can perform on that resource and under what conditions. In some embodiments, the identity and access management service 116 further supports trust policies, which can be attached to a role (e.g., one or more of roles 122A, ..., 122N). Because a role is both an identity and a resource that supports resource-based policies, in some embodiments, both a trust policy and an identity-based policy is attached to a role. Trust policies define which principal entities (accounts, users, roles, and federated users) can assume the role.

In some embodiments, a role is an identity that a user creates in an account that has specific permissions. A role is similar to a user, in that it is an identity with permission policies that determine what the identity can and cannot do. However, instead of being uniquely associated with one person, a role is intended to be assumable by anyone who needs it. Also, a role may not have standard long-term credentials such as a password or access keys associated with it. Instead, when an entity assumes a role, it is provided with temporary security credentials for a role session. Roles can be used to delegate access to users, applications, or services that do not normally have access to the resource. For example, a person might want to grant users in an account access to resources those users do not usually have access to or grant users in one account access to resources in another account.

As indicated above, in some cases and in addition to the types of access control described above provided by an identity and access management service 116, users may further desire to create so-called request-based policies to control how a data storage system, such as the one provided by the data storage service 102, responds to certain types of requests. In FIG. 1, the numbered circles "1"-"5" illustrate an example process including a user creating a request-based policy to be applied to requests for data objects stored by the data storage service 102, the data storage service 102 receiving a request to which the user-created request-based policy applies, and the data storage service 102 generating a response according to the identified request-based policy.

In some embodiments, at circle "1," a user uses a computing device 134 to generate a request-based policy configuration request 136 sent to the data storage service 102. The request-based policy configuration request 136 can be generated, for example, via a web-based console, CLI, or other interface provided by the interfaces 112 of the data storage service 102. For example, a user may access a policy configuration interface that enables users to specify components of a policy or to upload a policy created using a supported policy language.

In some embodiments, the creation of a request-based policy includes specifying a type of request to which the request-based policy is applicable, a type of response to generate responsive to identification of a request matching or corresponding to the type of request, and an indication of data objects to which the request-based policy is to be applied. The indication of the data objects to which the request-based policy is to be applied can include identifiers of one or more particular data objects, one or more logical data object containers, one or more principals (e.g., users or roles), one or more organizations of accounts, one or more tags, or any combinations thereof. These identifiers can include, for example, specific resource identifiers, wildcard matching patterns, tags, or any other identifiers of the applicable resources.

In some embodiments, the identification of a type of request to which a request-based policy, or a specific rule of the policy, is to be applied includes any type or combination of conditions defined relative to attributes of requests. Examples of such conditions can include, for example, whether an IP address associated with the request is within a specified IP range, whether the request originates from within a specific virtual private cloud, whether the request is authenticated or not, whether a signature generated based on the request matches a specified set of signatures, whether the request originates from a specified region, a user agent associated with the request, etc.

In some embodiments, users can also specify patterns of requests to which a request-based policy or rule applies. For example, a request-based policy can be associated with requests from a same source that exceed a request rate limit, where the same requestor has received N "data object not found" responses in a specified timeframe, where a requesting client's request pattern deviates from a baseline pattern by a specified degree, etc. In some embodiments, these request patterns can be monitored, e.g., by a request monitor 138 or other component of the data storage service 102, by a component of the identity and access management service 116, or other component of the provider network 100.

In some embodiments, at circle "2," the data storage service 102 generates and stores a request-based policy 140 based on the request-based policy configuration request 136. In other embodiments, the policy may be stored by the identity and access management service 116, e.g., alongside identity-based and resource-based policies stored for the user. In some embodiments, the policy is stored as a structured or semi-structured document (e.g., a JSON document) specifying the type or types of requests to which the policy, or to which one or more rules within the policy applies, response rules, etc., where these elements can be expressed using a policy language defined by the provider network 100. In some embodiments, the provider network 100 provides a set of default request-based policies that can be applied by a user with or without further customization.

In some embodiments, at circle "3," a computing device 142 sends a request 144 to the data storage service 102. The computing device 142 can be any client device capable of sending requests to the data storage service 102 including, e.g., requests sent via a web browser, using a CLI, or by an application running anywhere on the internet (e.g., a web-based service, a web crawler, etc.). In some embodiments, the request is sent using a RESTful API supported by the data storage service 102. These requests can be authenticated or anonymous. For example, authenticated requests include credentials that the provider network 100 can use to authenticate the request (e.g., by the identity and access management service 116). An authenticated request, for example, can include a signature created using valid credentials and included in request, while an unauthenticated request may not include any such credentials.

In some embodiments, the API supported by the data storage service 102 includes any number of actions, some of which involve accessing or modifying data objects stored by the data storage service. These actions can include, for example, retrieving a data object from a logical storage container (e.g., "get object"), adding an object to a logical storage container (e.g., "put object"), retrieving a list of logical storage containers or a list of data objects within one or more logical storage containers, deleting a data object or logical storage container, etc. In some embodiments, a logical storage container can include any logical collection of data objects including, e.g., a directory, a folder, a cloud resource used to organize a collection of data objects stored by a cloud-based data storage service, etc. In some embodiments, a request specifying an action further includes additional action parameters such as, for example, a full key name for a data object or logical storage container, encryption settings, etc. The following illustrates example partial syntax for a request to access a data object identified by the key name "/photos/image1.jpg" stored in a logical storage container named "example_container":

GET/photos/image1.jpg HTTP/1.1
Host: example_container.ss.example.com
[additional URI request parameters]

In some embodiments, at circle "4," a request monitor 138 of the data storage service 102 analyzes the request 144 with respect to one or more request-based policies 140 and determines a response to generate. In some embodiments, the request monitor 138 is any component of the interface(s) 112 provided by the data storage service 102, or a component of the identity and access management service 116, that can access a request context associated with requests at some point in time before the action specified by the request is executed by the data storage service 102 (e.g., as part of the authentication, authorization, and general request-based processing performed by the identity and access management service 116 and data storage service 102). As indicated above, a request-based policy 140 identifies a type of request to which the request-based policy is to be applied and a type of response to generate responsive to identification of a request matching the type of request. In some embodiments, analyzing the request 144 thus includes determining whether the request matches a type of request identified by one or more request-based policies 140 which may apply to the request, e.g., based on the request identifying a logical storage container or data object to which a policy applies.

Figure 2:
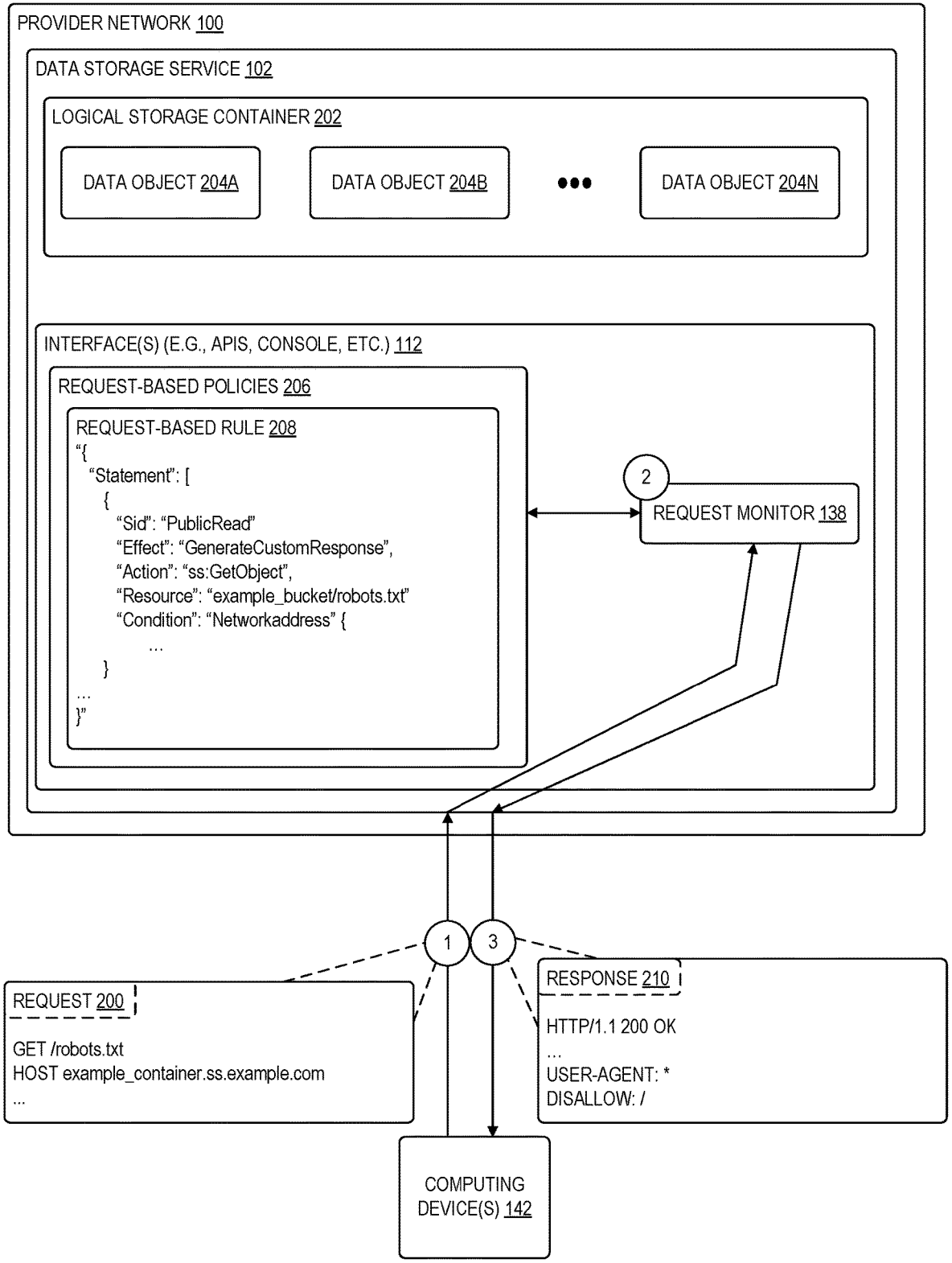
FIG. 2 is a diagram illustrating the application of a request-based policy to a request received by a data storage service of a cloud provider network and involving a logical storage container managed by the service, where a response generated based on the policy includes a dynamically generated data object according to some embodiments.
Figure 3:
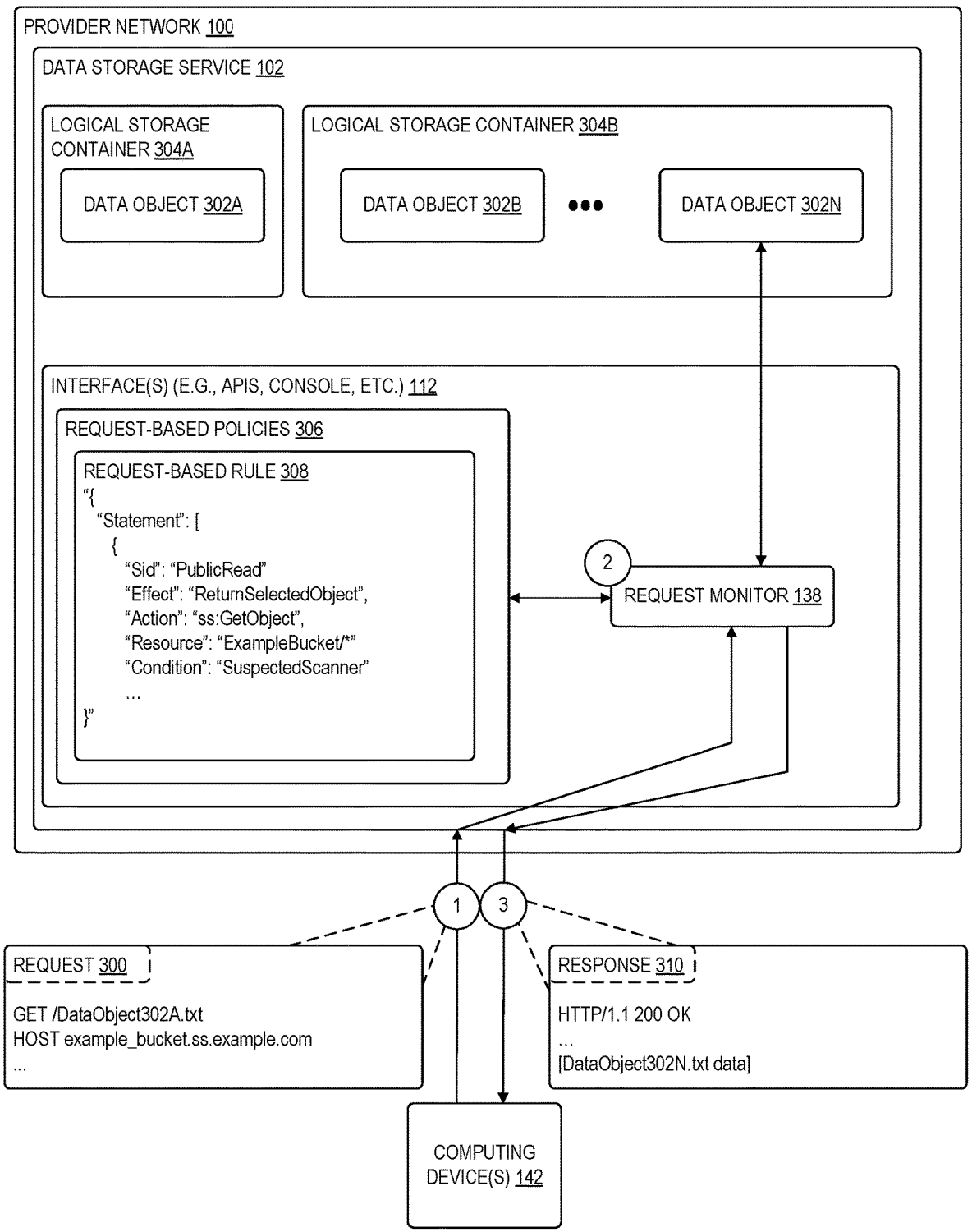
FIG. 3 is a diagram illustrating the application of a request-based policy to a request for a data object stored by a data storage service of a cloud provider network, where a response generated based on the policy includes an obtained data object that is different from the data object identified in the request according to some embodiments.

FIG. 2 and FIG. 3 illustrate example types of response actions that can be performed based on a request-based policy. The examples provided in FIG. 2 and FIG. 3 are for illustrative purposes only; virtually any type of possible response can be specified in a request-based policy in other examples. FIG. 2 is a diagram illustrating the application of a request-based policy to a request received by a data storage service of a cloud provider network and involving a logical storage container managed by the service, where a response generated based on the policy includes a dynamically generated data object according to some embodiments. In the example of FIG. 2, at circle "1," a computing device 142 sends a request 200 requesting to retrieve, or "get," a data object identified by the key name "/robots.txt" from a logical storage container 202. The request 200, for example, might be generated by a web crawler or other application attempting to index the files associated with the "example_container.ss.example.com" domain and first requesting a robots exclusion standard file to determine whether any indexing rules are applicable to the associated domain. It is noted that the logical storage container 202 includes one or more data objects 2004A, 204B, . . . , 204N, which may or may not include the data object identified by the request 200.

In some embodiments, at circle "2," the request monitor 138 analyzes the request 200 relative to one or more request-based policies 206. As indicated above, the request monitor 138 can receive request context associated with the request 200 at any point in time in the processing of the request by various components of the provider network 100 including, e.g., processing performed by an identity and access management service 116, data storage service 102, etc. In the example of FIG. 2, the request monitor 138 determines that a request-based policy 206, and in particular a request-based rule 208 specified in the policy, is applicable to the request 200 (e.g., because the rule specifies that it applies to public read requests for a data object identified by the key name "/robots.txt"). As described above, the requested robots.txt may or may not be stored in any logical storage containers 202. In some examples, the robots.txt data object does not exist in the associated logical storage container 202 identified by the request and, e.g., the logical storage container 202 instead includes some number of data objects 204A, 204B, . . . , 204N that a user does not want to be indexed by any web crawler. A user has thus created a request-based rule 208 indicating that requests for a robots.txt file associated with the logical storage container 202 are to result in the dynamic creation of a robots.txt file including an indexing rule that requests web crawlers not index any of the data objects.

In some embodiments, at circle "3" in FIG. 2, the request monitor 138 returns a response 210 including a robots.txt file. In this example, the request monitor 138 dynamically generates the robots.txt file according to the specified request-based rule as described above and without retrieving any actual data objects from a logical storage container 202. In other examples, a request-based policy might instruct the request monitor 138 to retrieve a robots.txt file from a logical storage container other than the one specified in the request 200. The example in FIG. 2 illustrates a request for a robots.txt file but similar techniques can be used to instruct a request monitor 138 to return custom data objects for any types or requests or for requests identifying particular data objects.

FIG. 3 is a diagram illustrating the application of a request-based policy to a request for a data object stored by a data storage service of a cloud provider network, where a response generated based on the policy includes an obtained data object that is different from the data object identified in the request according to some embodiments. In some embodiments, at circle "1," a computing device 142 sends a request 300 for a data object identified by the key name "/DataObject136A.txt" (e.g., possibly corresponding to the data object 302A stored in the logical storage container 304A. In this example, at circle "2," the request monitor 138 receives request context associated with the request 300 and determines that a request-based policy 306, and in particular a request-based rule 308, applies to the request 300. As indicated above, although a single request 300 is shown in FIG. 3, in some examples, the request monitor 138 determines that a request-based policy 306 applies to a request based on monitoring a pattern of requests (e.g., a pattern of requests from the same computing device 142 resulting in data object not found responses, a pattern of requests that deviates from an expected baseline request pattern, etc.).

In FIG. 3, the request-based rule 308 specifies that the request monitor 138 is to respond to requests for any data objects stored in the logical container 304A that match a pattern (e.g., a pattern associated with a suspected scanner) with a data object other than the data object requested. In the example of FIG. 3, at circle "3," the request-based monitor 138 retrieves a data object 302N from a different logical storage container 304B than the one specified in the request 300 and includes the data object 302N in the response 310. The returned data object 302N might include, for example, junk data or other data intended to hinder a client computing device's ability to scan logical storage containers for valuable data.

Returning to FIG. 1, in some embodiments, the generation of a response 146 by the request monitor 138 based on the application of a request-based policy 140 can include the execution of one or more custom response function(s) 148 by an on-demand code execution service 114. For example, a user of the cloud provider network 100 can create a custom response function 148 to generate custom response data based on attributes of the request (e.g., an IP address associated with the request, a type of the request identified based on request pattern analysis, etc.). In some embodiments, the response data generated by a custom response function 148 can include a custom data object, custom data object content, and the like, which can then be returned by the request monitor 138 as part of a response 146.

Figure 4:
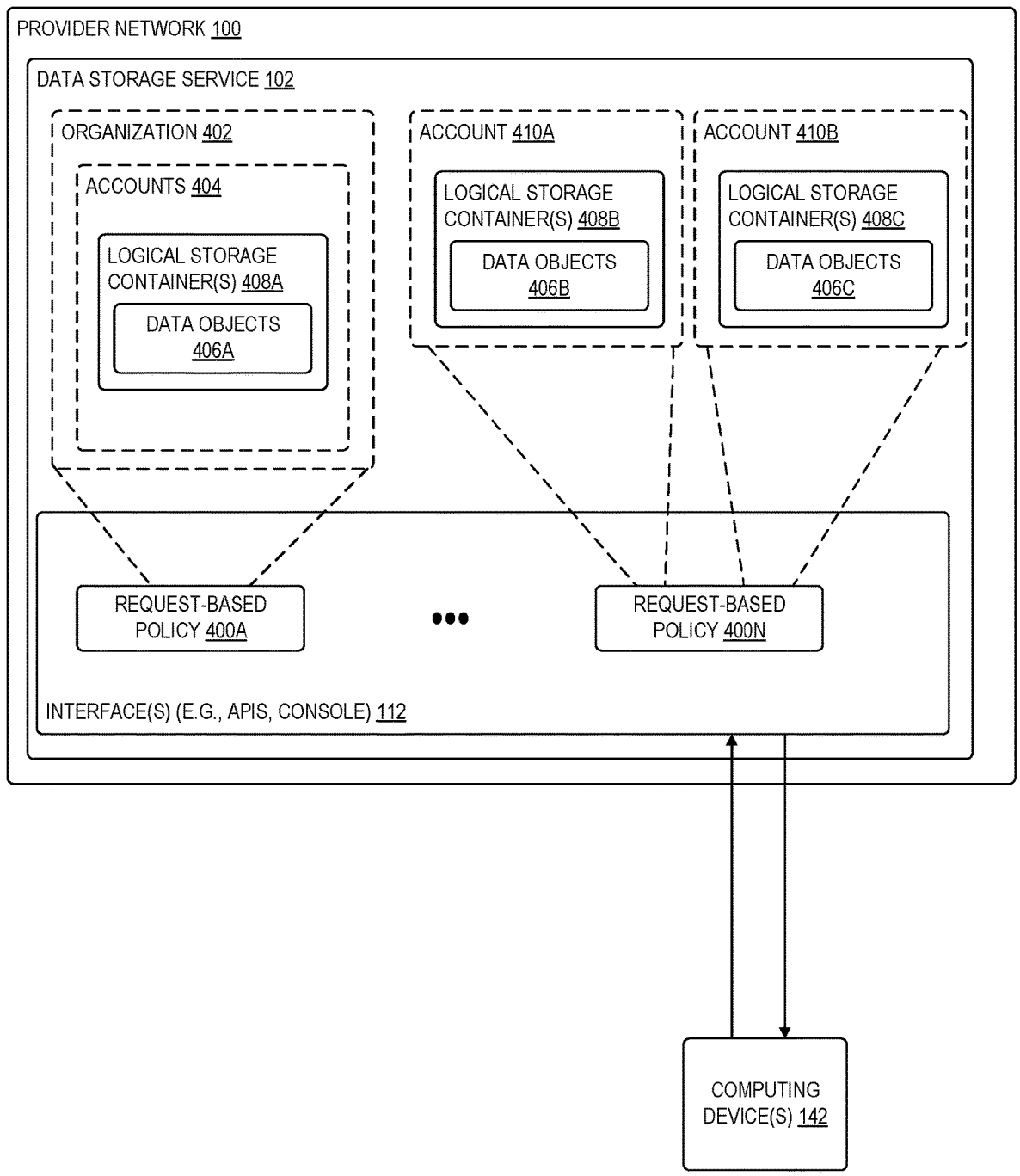
FIG. 4 is a diagram illustrating the association of a request-based policy to logical storage containers and data objects stored by a data storage service and associated with multiple user accounts of a cloud provider network according to some embodiments.

In some embodiments, a request-based policy 140 can be specific to the data objects and logical storage containers associated with a particular user of the cloud provider network 100 or applicable to a plurality of accounts or one or more organizations of accounts. FIG. 4 is a diagram illustrating the association of a request-based policy to logical storage containers and data objects stored by a data storage service and associated with multiple user accounts of a cloud provider network according to some embodiments.

As shown in FIG. 4, the request-based policy 400A is configured to apply to an entire organization 402, which can include any number of separate accounts 404, users, roles, etc. In this example, a request monitor 138 applies the request-based policy 400A to any applicable requests involving a data object 406A stored in logical storage container(s) 408A associated with any of the accounts of the organization 402. In this manner, for example, an administrator or other user of the organization 400 can create a single request-based policy that can be easily applied to any number of logical storage containers across an entire organization. For example, a single request-based policy can be specified for a type of response to generate responsive to requests identified as originating from web crawlers, etc., without the need to apply such a policy to each logical storage container individually. Similarly, a request-based policy 400N can be applied only to a selected set of accounts 410A, 410B, logical storage containers, data objects, or any combinations thereof.

Returning to FIG. 1, in some embodiments, at circle "5," the data storage service 102 sends a response 146 to the computing device 142 from which the request 144 originated. As indicated above, the response 146 can include a data object requested by the request if the request is authenticated, authorized, and no applicable request-based polices 140 apply to the request. Otherwise, if one or more request-based policies 140 apply to the request, the request monitor 138 returns a response 146 including a data object or other response data according to the applicable policy 140. In some embodiments, the request monitor 138 can further perform logging and auditing operations to log a type of response generated responsive to requests analyzed by the monitor.

Figure 5:
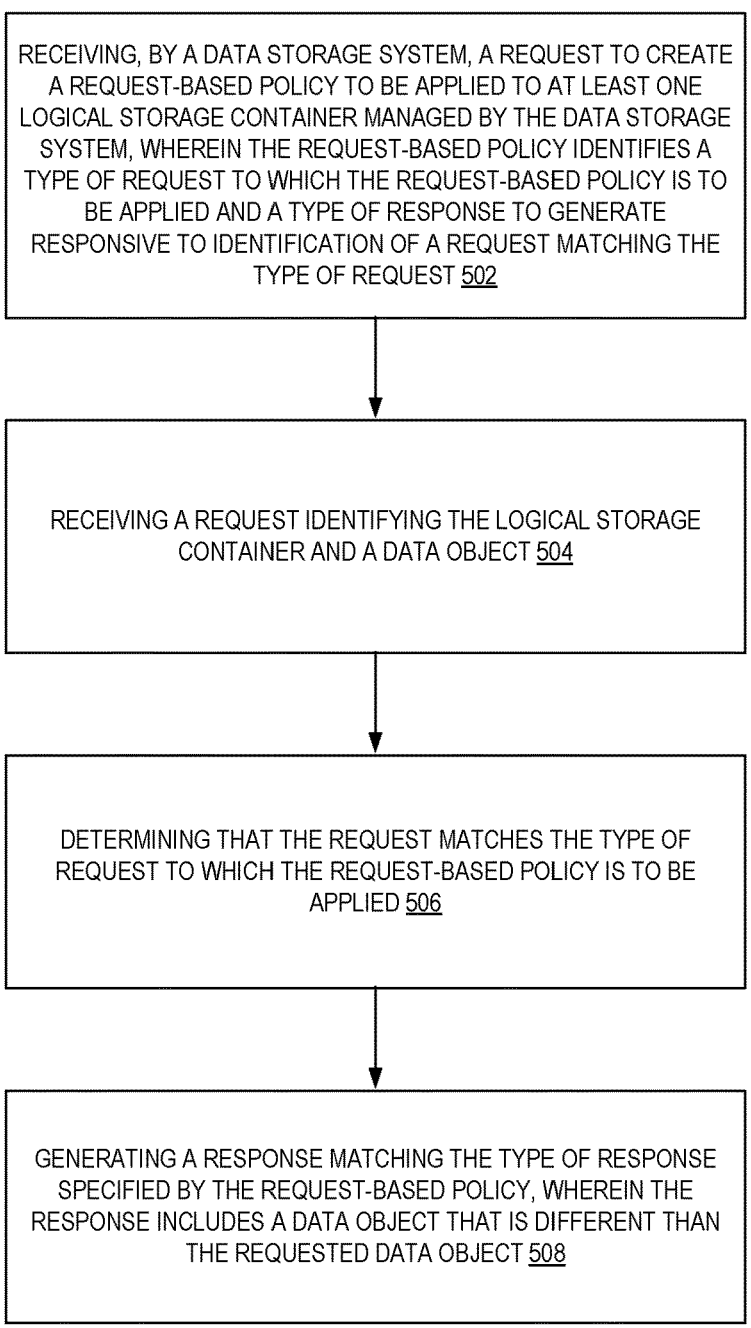
FIG. 5 is a flow diagram illustrating operations of a method for applying user-created request-based policies to requests involving data objects stored by a data storage system according to some embodiments.

FIG. 5 is a flow diagram illustrating operations 500 of a method for applying user-created request-based policies to requests involving data objects stored by a data storage system according to some embodiments. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 500 are performed by a data storage service 102 or identity and access management service 116 of the other figures.

The operations 500 include, at block 502, receiving, by a data storage system, a request to create a request-based policy to be applied to at least one logical storage container managed by the data storage system, wherein the request-based policy identifies a type of request to which the request-based policy is to be applied and a type of response to generate responsive to identification of a request matching the type of request.

The operations 500 further include, at block 504, receiving a request identifying the logical storage container and a data object.

The operations 500 further include, at block 506, determining that the request matches the type of request to which the request-based policy is to be applied.

The operations 500 further include, at block 508, generating a response matching the type of response specified by the request-based policy, wherein the response includes a data object that is different than the requested data object.

In some embodiments, the data storage system is a data storage service of a cloud provider network, wherein the request to access the data object is a request to retrieve a robots exclusion standards file from a logical storage container in which the data object is stored, and wherein the operations further include: generating the robots exclusion standard file, wherein the robots exclusion standard file includes at least one indexing rule; and include the robots exclusion standard file as part of the response.

In some embodiments, the data storage system is a data storage service of a cloud provider network, the request to create the request-based policy includes a request to apply the request-based policy to a plurality of user accounts of the cloud provider network.

In some embodiments, the operations further include generating, based on the request-based policy, the data object that is different than the requested data object, wherein the data object that is different than the requested data object is generated responsive to receiving the request for the data object.

In some embodiments, the data object is stored in a first logical storage container of a plurality of logical storage containers managed by the data storage system, and wherein the data object that is different than the requested data object is obtained from a second logical storage container.

In some embodiments, the data storage system is provided by a data storage service of a cloud provider network, wherein the data object is assigned a Uniform Resource Locator (URL) by the data storage service, and wherein the request includes the URL.

In some embodiments, the data storage system is a data storage service provided by a cloud provider network, and wherein an identity and access management service of the cloud provider network determines that the request matches the type of request to which the request-based policy is to be applied and generates the response.

In some embodiments, the request-based policy specifies a type of request pattern to which the request-based policy is to be applied, and the operations further include: analyzing a plurality of requests received by the data storage system including the request for the data object; and determining that the request matches the type of request to which the request-based policy is to be applied by determining that the plurality of requests matches the type of request pattern to which the request-based policy is to be applied.

In some embodiments, determining that the request matches the type of request to which the request-based policy is to be applied includes analyzing at least one of: whether the request is authenticated by a cloud provider network providing the data storage system, a user agent specified in the request, an Internet Protocol (IP) address identifying a source of the request, or a signature generated based on attributes of the request.

In some embodiments, the data object is further associated with a resource-based policy, and wherein the resource-based policy indicates a set of users that can access the data object and a set of actions that the set of users can perform on the data object.

In some embodiments, generating the response matching the type of response specified by the request-based policy includes causing an on-demand code execution service of a cloud provider network to execute a function identified by the request-based policy, wherein the function generates at least a portion of the data included in the response.

In some embodiments, the operations further include receiving a request to list the contents of a logical storage container containing the data object; generating, based on the request-based policy, a list of data objects that does not match the actual contents of the logical storage container; and generating a response including the list of data objects.

Figure 6:
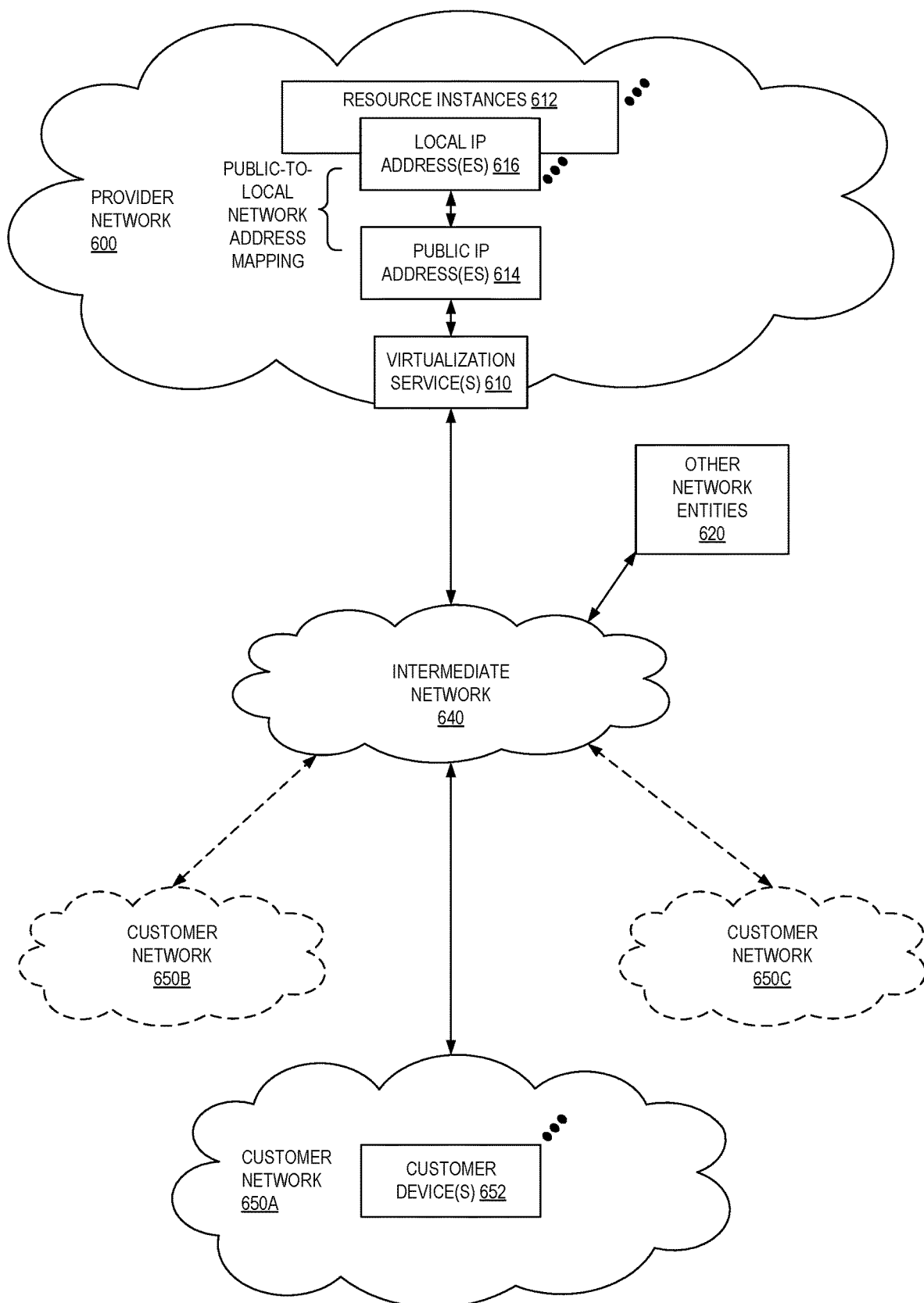
FIG. 6 illustrates an example provider network environment according to some embodiments.

FIG. 6 illustrates an example provider network (or "service provider system") environment according to some embodiments. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some embodiments, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
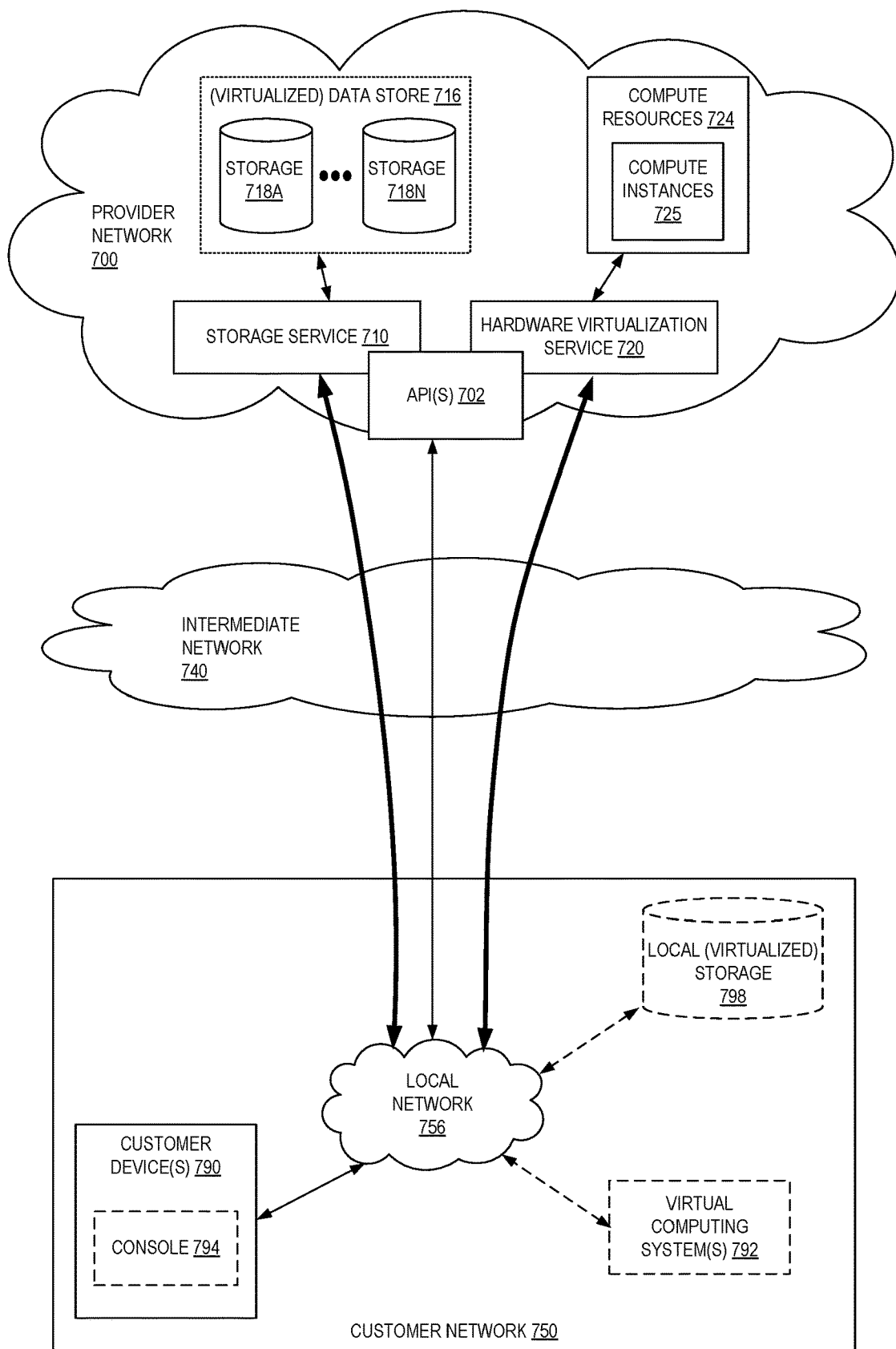
FIG. 7 is a block diagram of an example provider network that provides a storage service and a hardware virtualization service to customers according to some embodiments.

FIG. 7 is a block diagram of an example provider network environment that provides a storage service and a hardware virtualization service to customers, according to some embodiments. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some embodiments, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some embodiments, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some embodiments, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some embodiments, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s)

702 to request allocation of one or more resource instances within the virtual network or within another virtual network.

Figure 8:
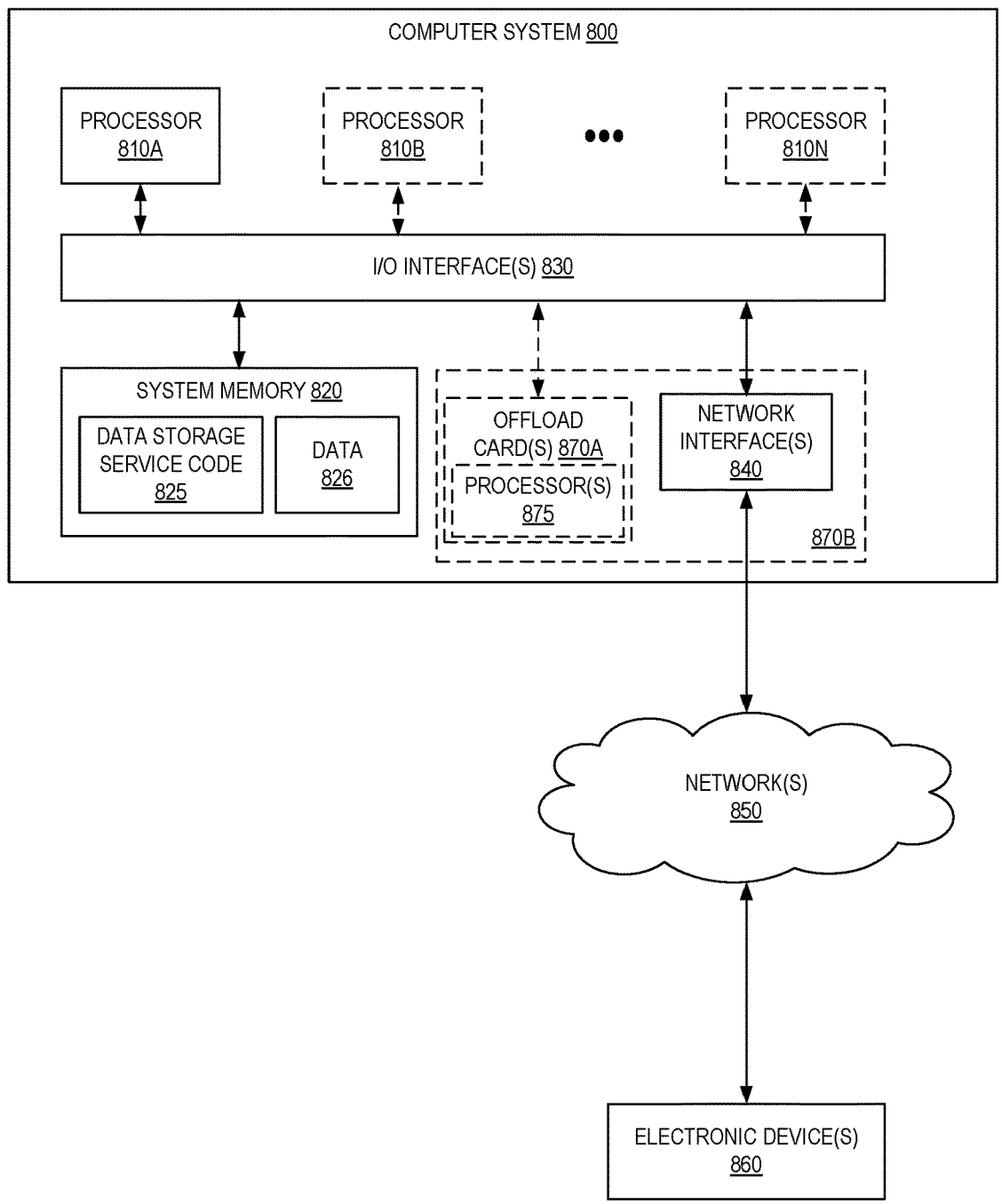
FIG. 8 is a block diagram illustrating an example computer system that can be used in some embodiments.

In some embodiments, a system that implements a portion or all of the techniques described herein can include a general-purpose computer system, such as the computer system 800 illustrated in FIG. 8, that includes, or is configured to access, one or more computer-accessible media. In the illustrated embodiment, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various embodiments the computer system 800 can include one computing device or any number of computing devices configured to work together as a single computer system 800.

In various embodiments, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various embodiments, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various embodiments, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 820 as data storage service code 825 (e.g., executable to implement, in whole or in part, the data storage service 102) and data 826.

In some embodiments, the I/O interface 830 can be configured to coordinate I/O traffic between the processor 810, the system memory 820, and any peripheral devices in the device, including the network interface 840 and/or other peripheral interfaces (not shown). In some embodiments, the I/O interface 830 can perform any necessary protocol, timing, or other data transformations to convert data signals from one component (e.g., the system memory 820) into a format suitable for use by another component (e.g., the processor 810). In some embodiments, the I/O interface 830 can include support for devices attached through various types of peripheral buses, such as a variant of the Peripheral Component Interconnect (PCI) bus standard or the Universal Serial Bus (USB) standard, for example. In some embodiments, the function of the I/O interface 830 can be split into two or more separate components, such as a north bridge and a south bridge, for example. Also, in some embodiments, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various embodiments, the network interface 840 can support communication via any suitable wired or wireless general data networks, such as types of Ethernet network, for example. Additionally, the network interface 840 can support communication via telecommunications/ telephony networks, such as analog voice networks or digital fiber communications networks, via storage area networks (SANs), such as Fibre Channel SANs, and/or via any other suitable type of network and/or protocol.

In some embodiments, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations, such as pausing and/or un-pausing compute instances, launching and/or terminating compute instances, performing memory transfer/copying operations, etc. These management operations can, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and can not coordinate with (or service) any separate hypervisor.

In some embodiments, the system memory 820 can be one embodiment of a computer-accessible medium configured to store program instructions and data as described above. However, in other embodiments, program instructions and/ or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
    receiving, by a data storage system, a request to create a request-based policy that is to control how the data storage system is to respond to requests involving a logical storage container managed by the data storage system based on a type of the requests, wherein the request-based policy identifies a type of request to which the request-based policy is to be applied and further identifies a type of response that the data storage system is to generate responsive to identification of a request involving the logical storage container and matching the type of request;
    receiving a request originated by a client seeking to retrieve a data object of the logical storage container;
    determining that the request-based policy applies to the request based on determining that a type of the request matches the type of request to which the request-based policy is to be applied;
    generating a response matching the type of response specified by the request-based policy, wherein the response includes a data object that is different than the requested data object; and
    transmitting the response to the client, where the response includes the data object that is different than the requested data object.

2. The computer-implemented method of claim 1, wherein the data storage system is a data storage service of a cloud provider, wherein the request is a request to retrieve a robots exclusion standards file from the logical storage container, and wherein:
    generating the response comprises generating the robots exclusion standard file, wherein the robots exclusion standard file includes at least one indexing rule; and
    the generated robots exclusion standard file is returned as the data object that is part of the response.

3. The computer-implemented method of claim 1, wherein the data storage system is a data storage service of a cloud provider, wherein the request to create the request-based policy includes a request to apply the request-based policy to a plurality of user accounts of the cloud provider, wherein the logical storage container is associated with at least one of the plurality of user accounts.

4. The computer-implemented method of claim 1, further comprising generating, based on the request-based policy, the data object that is different than the requested data object, wherein the data object is generated responsive to receiving the request for the data object.

5. The computer-implemented method of claim 1, wherein the data object that is different than the requested data object is obtained from the logical storage container that is different from the logical storage container identified in the request.

6. The computer-implemented method of claim 1, wherein the data storage system is provided by a data storage service of a cloud provider, wherein the data object is assigned a Uniform Resource Locator (URL) by the data storage service, and wherein the request includes the URL.

7. The computer-implemented method of claim 1, wherein the data storage system is a data storage service provided by a cloud provider, and wherein an identity and access management service of the cloud provider determines that the request matches the type of request to which the request-based policy is to be applied and generates the response.

8. The computer-implemented method of claim 1, wherein determining that the request matches the type of request to which the request-based policy is to be applied includes analyzing at least one of:
    whether the request is authenticated by a cloud provider providing the data storage system,
    a user agent specified in the request,
    an Internet Protocol (IP) address identifying a source of the request, or
    a signature generated based on attributes of the request.

9. The computer-implemented method of claim 1, wherein the data object is further associated with a resource-based policy, and wherein the resource-based policy indicates a set of users that can access the data object and a set of actions that the set of users can perform on the data object.

10. The computer-implemented method of claim 1, wherein generating the response matching the type of response specified by the request-based policy includes causing an on-demand code execution service of a cloud provider to execute a function identified by the request-based policy, wherein the function generates at least a portion of the data included in the response.

11. The computer-implemented method of claim 1, further comprising:
    receiving a request to list the contents of the logical storage container containing the data object; and
    generating, based on the request-based policy, a list of data objects that does not match the actual contents of the logical storage container, wherein the data object that is returned comprises the generated list of data objects.

12. A system comprising:
a first one or more electronic devices to implement data storage system in a cloud provider network; and
a second one or more electronic devices to implement a data storage service in the cloud provider network, the data storage service including instructions that upon execution cause the data storage service to:
receive a request to create a request-based policy that is to control how the data storage service is to respond to requests involving a logical storage container managed by the data storage system based on a type of the requests, wherein the request-based policy identifies a type of request to which a rule is to be applied and further identifies a type of response to generate responsive to identification of a request involving the logical storage container and matching the type of request;
receive a request originated by a client seeking to retrieve a data object of the logical storage container;
determine that the request-based policy applies to the request based on determining that a type of the request matches the type of request to which the request-based policy is to be applied;
generate a response matching the type of response specified by the request-based policy, wherein the response does not include a data object that is different than the requested data object; and
transmit the response to the client, where the response includes the data object that is different than the requested data object.

13. The system of claim 12, wherein the request is a request to retrieve a robots exclusion standards file from the logical storage container, and wherein:
to generate the response, the data storage service is to generate the robots exclusion standard file, wherein the robots exclusion standard file includes at least one indexing rule; and
the robots exclusion standard file is returned as the data object as part of the response.

14. The system of claim 12, wherein the data storage system is a data storage service of a cloud provider, wherein the request to create the request-based policy includes a request to apply the request-based policy to a plurality of user accounts of the cloud provider, wherein the logical storage container is associated with at least a user account of the plurality of user accounts, and wherein the data storage service further includes instructions that upon execution cause the data storage service to determine that the data object is associated with the user account of the plurality of user accounts.

15. The system of claim 12, wherein the instructions upon execution further cause the data storage service to generate, based on the request-based policy, the data object that is different than the requested data object, wherein the data object is generated responsive to receiving the request for the data object.

16. The system of claim 12, wherein the data object that is different than the requested data object is obtained from the logical storage container that is different from the logical storage container identified in the request.

17. A computer-implemented method comprising:
receiving, by a data storage system, a request to create a request-based policy to be applied to at least one logical storage container managed by the data storage system, wherein the request-based policy identifies a type of request to which the request-based policy is to be applied and a type of response to generate responsive to identification of a request matching the type of request, wherein the request-based policy specifies a type of request pattern to which the request-based policy is to be applied;
receiving a request identifying the logical storage container and a data object;
analyzing a plurality of requests received by the data storage system including the request for the data object;
determining that the request matches the type of request to which the request-based policy is to be applied by determining that the plurality of requests matches the type of request pattern to which the request-based policy is to be applied; and
generating a response matching the type of response specified by the request-based policy, wherein the response includes a data object that is different than the requested data object.

18. The computer-implemented method of claim 17, wherein generating the response matching the type of response specified by the request-based policy includes causing an on-demand code execution service of a cloud provider to execute a function identified by the request-based policy, wherein the function generates at least a portion of the data included in the response.

19. The computer-implemented method of claim 17, wherein the data storage system is a data storage service of a cloud provider, wherein the request to create the request-based policy includes a request to apply the request-based policy to a plurality of user accounts of the cloud provider.

20. The computer-implemented method of claim 17, further comprising generating, based on the request-based policy, the data object that is different than the requested data object, wherein the data object is generated responsive to receiving the request for the data object.

* * * * *